United States Patent
Schroll et al.

(10) Patent No.: US 6,775,436 B1
(45) Date of Patent: Aug. 10, 2004

(54) OPTICAL FIBER U-TURN APPARATUS AND METHOD

(75) Inventors: Kenneth R. Schroll, Chatham, NJ (US); James P. Waters, Boonton Township, NJ (US)

(73) Assignee: General Dynamics Advanced Technology Systems, Inc., McLeansville, NC (US)

( * ) Notice: Subject to any disclaimer, the term of this patent is extended or adjusted under 35 U.S.C. 154(b) by 0 days.

(21) Appl. No.: 10/083,184

(22) Filed: Feb. 26, 2002

(51) Int. Cl.[7] .................................................. G02B 6/34
(52) U.S. Cl. .............................. 385/36; 385/18; 385/32; 385/47
(58) Field of Search ............................. 385/18, 32, 36, 385/47, 125

(56) References Cited

U.S. PATENT DOCUMENTS

| | | | | |
|---|---|---|---|---|
| 3,886,544 | A | 5/1975 | Narodny | 340/365 |
| 4,626,066 | A | 12/1986 | Levinson | 350/96.18 |
| 4,767,171 | A * | 8/1988 | Keil et al. | 385/35 |
| 4,854,658 | A | 8/1989 | Stanley | 350/96.15 |
| 5,028,104 | A | 7/1991 | Kokoshvili | 350/91.15 |
| 5,138,676 | A | 8/1992 | Stowe et al. | 385/32 |
| 5,175,780 | A | 12/1992 | Sano et al. | 385/47 |
| 5,226,104 | A | 7/1993 | Unterleitner et al. | 385/140 |
| 5,321,774 | A | 6/1994 | Barnard et al. | 385/16 |
| 5,408,552 | A | 4/1995 | Davenport et al. | 385/31 |
| 5,786,925 | A | 7/1998 | Goosen et al. | 359/245 |
| 5,815,627 | A * | 9/1998 | Harrington | 385/125 |
| 5,841,583 | A * | 11/1998 | Bhagavatula | 359/577 |
| 5,841,917 | A | 11/1998 | Jungerman et al. | 385/17 |
| 5,960,132 | A | 9/1999 | Lin | 385/18 |
| 6,009,219 | A | 12/1999 | Doyle | 385/23 |
| 6,031,952 | A | 2/2000 | Lee | 385/47 |
| 6,137,933 | A * | 10/2000 | Hunter et al. | 385/37 |
| 6,243,513 | B1 * | 6/2001 | Wade | 385/24 |
| 6,275,626 | B1 * | 8/2001 | Laor | 385/18 |
| 6,282,006 | B1 * | 8/2001 | Tamada et al. | 359/173 |
| 6,400,862 | B1 * | 6/2002 | Liu et al. | 385/24 |
| 6,453,083 | B1 * | 9/2002 | Husain et al. | 385/17 |
| 6,470,114 | B1 * | 10/2002 | Kloth | 385/31 |
| 6,501,877 | B1 * | 12/2002 | Weverka et al. | 385/31 |
| 6,526,196 | B1 * | 2/2003 | Li | 385/18 |
| 6,571,033 | B2 * | 5/2003 | Caracci et al. | 385/24 |
| 2003/0081885 | A1 * | 5/2003 | Chen et al. | 385/18 |

* cited by examiner

*Primary Examiner*—Akm Enayet Ullah
*Assistant Examiner*—Daniel Petkovsek
(74) *Attorney, Agent, or Firm*—Jenner & Block LLP

(57) ABSTRACT

A first optical fiber, a second optical fiber, and a prism are used to turn light through 180° in a small space. The prism can be a discrete microprism or a custom prism specially made using precision molding techniques or by specially machining a section of coreless optical fiber using precision machining techniques. A precision holder or substrate can be used to facilitate molding of a prism and/or assembly of the overall apparatus.

42 Claims, 2 Drawing Sheets

OPTICAL FIBER U-TURN APPARATUS AND METHOD

BACKGROUND OF THE INVENTION

1. The Technical Field

The present invention is directed generally to the field of fiber optics. More particularly, the present invention is directed to an apparatus and method for effecting an optical U-turn in an optical fiber in a small space.

2. The Prior Art

In highly-integrated fiber optic assemblies, there often is a need to turn a fiber through 180° in a very small space. Simply bending the fiber tightly is usually not satisfactory because tight bends in optical fibers cause high bending losses which reduce the fiber's efficiency and high bending stresses which aggravate the risk of fiber failure.

One approach to effecting an optical U-turn in a small space includes etching and/or heating and drawing the optical fiber to reduce its diameter to a few microns. The reduced diameter section is then formed into a tight 180° bend. The resulting device could be used as-is, but would be very fragile and prone to breakage. However, the reduced diameter section can be protected by encapsulating it in a suitable encapsulant. A low refractive index encapsulant can be used to confine the mode field in the reduced diameter section, such that the resulting U-turn achieves low optical loss. In principle, a U-turn device constructed in this way might be only slightly more than two fiber diameters in width. U.S. Pat. No. 5,138,676 to Stowe, et al. entitled "Miniature Fiberoptic Bend Device and Method" describes this approach.

The foregoing technique has several drawbacks. For example, the tapered transition region between the original fiber diameter and the reduced diameter section must be precisely controlled to minimize light loss. This requires specialized equipment and control algorithms. Also, the reduced diameter section is extremely fragile. Thus, successfully fabricating and packaging such a U-turn device would be very challenging. Further, it is not clear that such devices would be reliable over the long term. For example, temperature fluctuations could produce severe stresses in the reduced-diameter section if the thermal properties of the encapsulant were not closely matched to those of the glass fiber.

Another way to effect an optical U-turn in a fiber is to cleave the fiber and use discrete mirrors or a prism, along with the required alignment optics, to turn the light. FIG. 1 illustrates one such type of device. The device includes a first collimator 12 connected to a first optical fiber 10 and a second collimator 16 similarly connected to a second optical fiber 14. First and second collimators 12 and 14 are each connected to a discrete, miniature 90° prism 18. Typically, the 90° surfaces of prism 18 are surrounded by a low index medium, such as air, and the light is turned by total internal reflection. While this simple technique overcomes many of the shortcomings of the bend-type device discussed above, achieving the alignment precision required for low loss with single mode fiber is difficult using discrete components, and the resulting size of the U-turn assembly typically would be much larger than a few fiber diameters.

It would be desirable to provide a method of fabricating a prism-type optical fiber U-turn device which overcomes the difficulties in achieving the required alignment precision. It also would be desirable to provide a prism-type optical U-turn device using an integral prism and a method of making such a device.

SUMMARY OF THE INVENTION

The present invention provides a method and apparatus for effecting a "U-turn" in an optical fiber with low loss in a space potentially only two fiber diameters wide. Such a device includes a prism, a first optical fiber which admits light to the prism (an input fiber), and a second optical fiber which carries light from the prism (an output fiber). Some embodiments further include a substrate for maintaining the necessary optical alignments between the prism and the first and second, or input and output, optical fibers.

The input and output fibers preferably are made of single mode optical fiber. Alternatively, they can be made of multimode fiber. In a preferred embodiment, a collimator is connected to the end of each of the input and output fibers, between the fibers and the prism. These collomators preferably are made of a gradient index optical fiber. In an alternate embodiment, a collimator is connected to only one of the input and output fibers. In another alternate embodiment, a focusing lens is connected to only one of the input and output fibers via an intervening optical coupler, such as a section of coreless fiber or an optical gel appropriately formed for this purpose. When an optical gel is used, it should be index-matched to the cladding of the fiber(s) it is connected to. That is, the refractive index of the optical gel should be substantially the same as the refractive index of the cladding of the fiber it is connected to.

The prism can be a discrete, commercially available component, or it can be custom fabricated for this application. In some embodiments, the prism can be custom molded from an index-matched adhesive or optical gel as part of the assembly process. In other embodiments, the prism can be machined or otherwise formed from a section of coreless optical fiber connected to the end of the input and output fibers.

The substrate, where used, preferably is machined from silicon using a deep reactive ion etching process or from nickel using a LIGA process. Alternatively, the substrate can be precision molded from a suitable plastic or other material. The substrate preferably includes one or more channels for locating and/or securing the input and output fibers (and/or the focusing devices connected thereto). In embodiments using a discrete prism, the substrate preferably is further configured to locate and/or secure the prism. In embodiments using a molded prism, the substrate preferably is further configured to provide a mold for forming the molded prism in situ. Preferably, a prism thus formed is integral with the input and output fibers (and/or the focusing devices connected thereto).

DETAILED DESCRIPTION OF THE DRAWINGS

The present invention provides a method and apparatus for effecting an optical U-turn in an optical fiber with low loss in a space potentially only two fiber diameters wide. The present invention employs input and output fibers with integral gradient index collimators to facilitate the necessary alignments. The invention can be realized in several embodiments.

Figure 1:
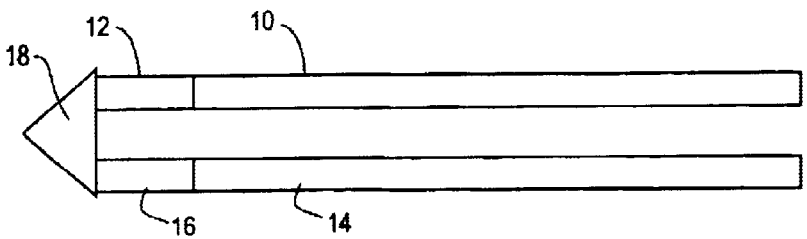
FIG. 1 illustrates a prior art device.
Figure 2:
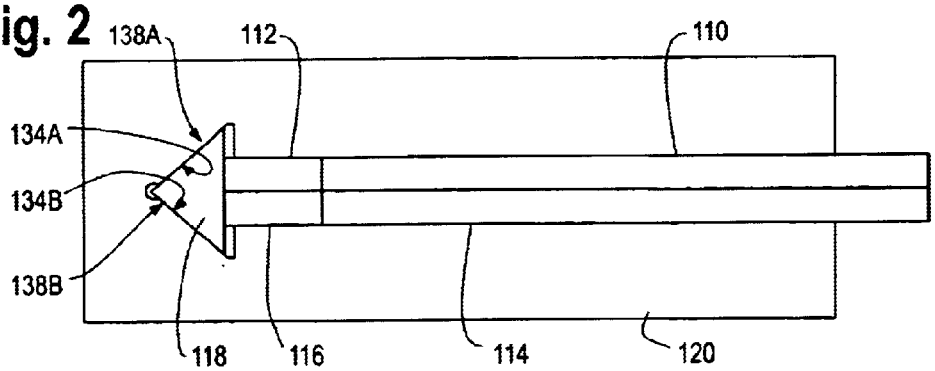
FIG. 2 illustrates a first embodiment of a device according to the present invention.

One such embodiment is illustrated in FIG. 2. In this embodiment, the cleaved end of a first optical fiber 110 is connected to a first collimator 112 and the cleaved end of a second optical fiber 114 is connected to a second collimator 116. In a preferred embodiment, first and second optical fibers 10 and 114 are made of single mode fiber with cleaved end. This and other embodiments also can be practiced using multi-mode fiber. Preferably, first and second collimators 112 and 116 are made of a piece of gradient index fiber which may be, for example, 62.5 micron core with 125 micron cladding or 100 micron core with 140 micron cladding. Preferably first and second optical fibers 110 and 114 are fusion spliced to first and second collimators 112 and 116, respectively, although mechanical or other splices can be used in lieu of fusion splices. First and second collimators 112 and 116 are in turn connected to a miniature prism 118. Prism 118 can be any suitable, miniature prism, preferably a 90° prism. Prisms as small as 350 microns on a side are currently available commercially.

Figure 8:
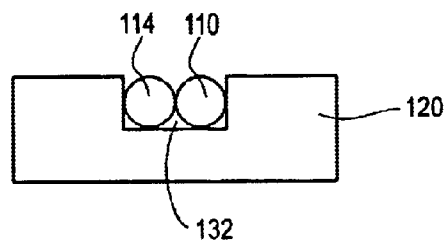
FIG. 8 illustrates an end elevation view of the devices illustrated in, for example, FIG. 2.

First and second optical fibers 110 and 114, their respective collimators 112 and 116, and prism 118 can be mounted on a precision holder 120. Holder 120 facilitates the necessary optical alignment among these components. Holder 120 can be, for example, fabricated in silicon using the deep reactive ion etching (DRIE) process. Alternatively, holder 120 can be fabricated using precision injection molding techniques. It also is feasible to fabricate holder 120 from other materials and/or using other methods. In a preferred embodiment, holder 120 is configured to hold prism 118 and includes a channel 132, as shown in FIG. 8, sized to hold first and second optical fibers 110 and 114 with their respective collimators 112 and 116 in side-by-side abutment. Channel 132 is configured to provide the required symmetry of the optical fibers about the prism apex, as would be known to one skilled in the art.

The foregoing embodiment can be fabricated by aligning and securing first and second optical fibers 110 and 114 and/or their respective collimators 112 and 116 on holder 120, aligning prism 118 with fibers 110 and 112 114, and bonding the ends of the collimators to the prism using an index matched adhesive. The axes of the fibers with attached collimators preferably lie in a common plane perpendicular to the 45° planes 134A, 134B of the prism, and the prism apex 136 preferably is centered between the fiber axes. Although FIG. 2 illustrates optical fibers 110 and 114 and their respective collimators in side-by-side abutment, they also could be spaced apart from one another. In the FIG. 2 embodiment, the light preferably is turned by total internal reflection by, for example, providing a thin air gap (air being a low-index medium) between the 45° planes 134A, 134B the prism and the 45° planes/sidewalls 138A, 138B of the holder, respectively.

Figure 3:
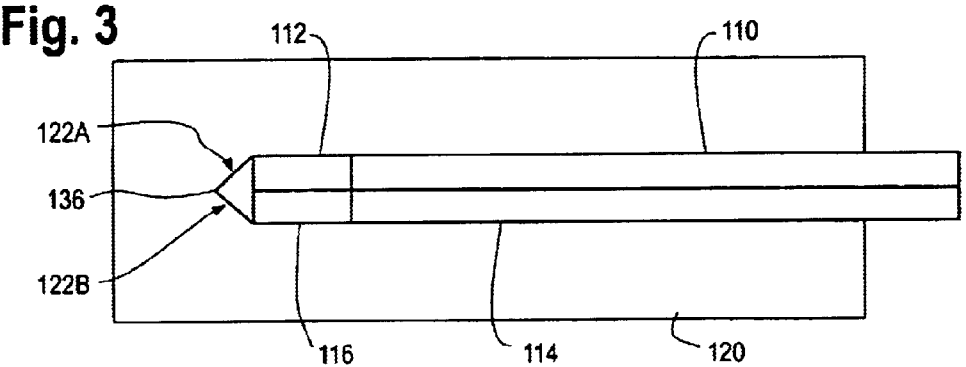
FIG. 3 illustrates a second embodiment of a device according to the present invention.

An alternative embodiment illustrated in FIG. 3 eliminates the discrete prism. In this embodiment, a material 122 having the refractive index of fused silica (for example, a sol-gel, as would be known to one skilled in the art) filling the region 122A of holder 120 adjacent the free end of collimators 112 and 116 is effectively molded into a prism to perform the optical turn-around function. This approach requires that the vertical side walls 138A, 138B of region 122A of holder 120 be of optical quality, i.e., extremely smooth and truly vertical. The reflective 45° planes of the prism thus formed may be provided with a highly reflective coating to increase efficiency.

Figure 4:
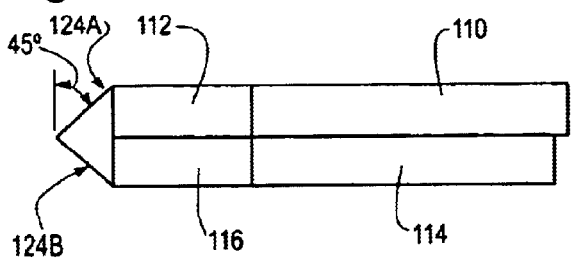
FIG. 4 illustrates a third embodiment of a device according to the present invention.
Figure 5:
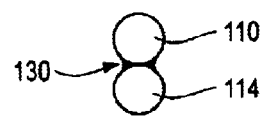
FIG. 5 is a end elevation view of the device illustrated in FIG. 4.

Yet another embodiment of the invention is illustrated in FIG. 4. For a given fiber diameter, a device according to this embodiment is likely to be smaller overall than devices fabricated according to the FIG. 2 or FIG. 3 embodiments. In this embodiment, a first length of coreless fiber 124A is optically coupled, for example, fusion-spliced, to the end of first collimator 112 and a second length of coreless fiber 124B is optically coupled to second collimator 116. Each such length of coreless fiber is then end-polished to a 45° angle. The two collimators 112 and 116 (with attached coreless sections 124A and 124B) and their respective fibers 110 and 114 are placed side-by-side in a suitable fixture (not shown), and an adhesive 130 is applied lengthwise between the respective fibers and collimators, at least partially filling the valley along the sides of the fibers and collimators, so as to hold them together, as shown in FIG. 5. The adhesive must fill the region between the coreless fiber sections 124A and 124B where the turned light propagates. The adhesive must have a refractive index closely matched to that of the coreless sections 124. The angle-polished faces turn the light by total internal reflection if surrounded by a low index medium, such as air. The end of the U-turn device could be potted for ruggedness inside a small-diameter sleeve, while maintaining a small overall size. If the device is so encapsulated, the angle-polished faces must be dielectric coated to ensure total internal reflection. Alternatively, the polished faces could be coated with a highly reflective material. In an alternate embodiment, a single length of coreless fiber (not shown) of sufficiently large diameter could be optically coupled to both of first and second collimators 112 and 116 and end polished to form a prism in a manner similar to that described above.

Each of the foregoing embodiments illustrated in FIGS. 2–4 is symmetrical in that each of these embodiments uses a collimator in connection with both the input fiber and output fiber to the light turnaround device, namely discrete prism 118, molded prism 122 or other coreless fiber prism 124. The present invention also can be implemented in asymmetrical embodiments where, for example, the output fiber incorporates a focusing lens and the input fiber is not lensed, as described below.

Figure 6:
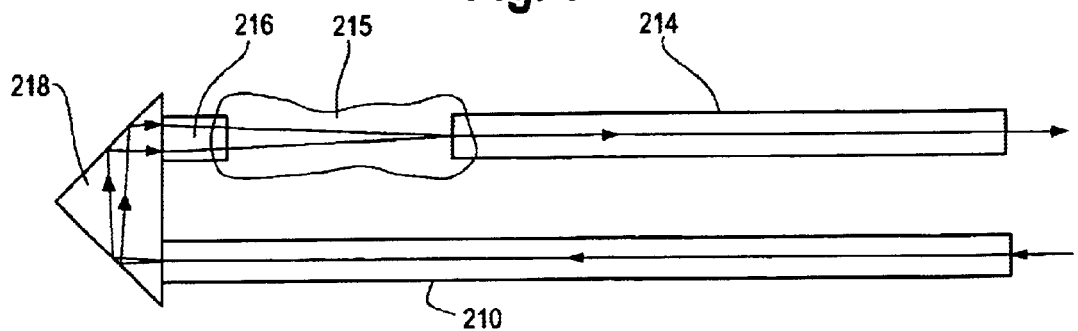
FIG. 6 illustrates an alternate embodiment of a device according to the present invention.

For example, FIG. 6 illustrates a U-turn device wherein input fiber 210 is a cleaved single mode fiber directly coupled to a prism 218 with no intervening collimator. Output fiber 214 comprises a single mode fiber connected to a gradient index ("GRIN") focusing lens 216 via an intervening index matching gel 215 (or similar material) which couples the light from lens 216 to output fiber 214. Index matching gel 215 preferably has an index of refraction matching that of the cladding of output fiber 214. Focusing lens 216 is coupled to prism 218. In this embodiment, the length of the light path in the prism and the distance between the lens and the output fiber must match the object and image distances of the lens, as would be known to one skilled in the art. Further, the length of the light path in the prism should be (for high efficiency) be short enough to assure that the light beam, as it travels through the prism, doesn't expand to a diameter exceeding the active area of the lens.

The precise alignments required to implement this embodiment can be provided using conventional micromachined components.

Figure 7:
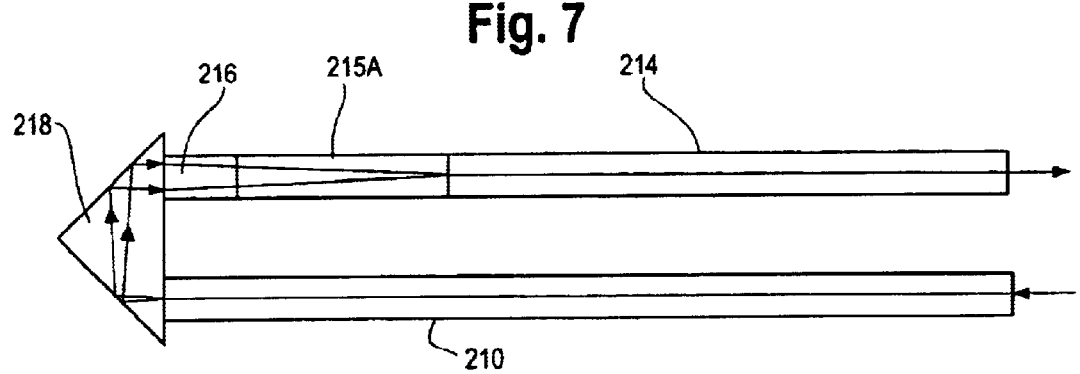
FIG. 7 illustrates another alternate embodiment of a device according to the present invention.

FIG. 7 illustrates a variation on the FIG. 6 embodiment wherein a coreless fiber spacer 215A having substantially the same diameter as output fiber 214 and lens 216 is situated between output fiber 214 and lens 216. It is convenient, though not essential to join these three components together into a single unit. Lensed fibers of this type, i.e., a GRIN focusing lens, a coreless fiber spacer, and a single mode optical fiber fusion-spliced together are available commercially from High Wave Optical, a French company.

The principles of the modifications set forth in FIGS. 6 and 7 can be applied to any of the FIGS. 2–4 embodiments or modifications thereof. Because lensed fibers are relatively expensive specialty components, the modifications set forth in the FIGS. 6 and 7 asymmetrical embodiments employing only one lensed fiber may be preferable in applications requiring low cost.

The FIG. 2–4 embodiments, being symmetrical with respect to the input and output fibers are bidirectional. That is, either fiber 110 or 114 can be used as either an input fiber or an output fiber. Though not immediately obvious, the alternate embodiments shown in FIGS. 6 and also can be used bidirectionally because of the reciprocal performance of the focusing lens.

In any of the foregoing embodiments, several optical fiber U-turns could be stacked up (not shown). For example, in the FIG. 2 and FIG. 3 embodiments (and variations and modifications thereof) employing the micromachined substrate (with or without the separate prism), several of the substrates (typically about 0.5 mm thick) could be stacked to accommodate multiple fiber U-turns needed for fiber ribbons. Similarly, in the FIG. 4 embodiment (and variations and modifications thereof) using the angle-polished coreless fiber prism, multiple U-turns could be potted together inside a common sleeve to achieve a small, rugged fiber ribbon turn-around. As suggested above, a very small, low-loss fiber ribbon U-turn device could be offered with fiber pigtails to permit easy fusion-splicing into a higher-level assembly.

The foregoing description is merely illustrative of certain preferred embodiments of the present invention. Those skilled in the art will recognize that modifications and variations thereto can be implemented without departing from the spirit of the invention, the scope of which is limited only by the claims appended hereto.

We claim:

1. An apparatus comprising:
    a first optical fiber having a first end;
    a first collimator having a first end and a second end, said first end of said first collimator connected to said first end of said first optical fiber;
    a second optical fiber having a first end;
    a second collimator having a first end and a second end, said first end of said second collimator connected to said first end of second optical fiber;
    a prism connected to said second end of said first collimator and to said second end of said second collimator; and
    a substrate comprising at least one groove, at least one of said first collimator and said second collimator received in said groove in optical alignment with said prism.

2. The apparatus of claim 1 wherein said substrate is a precision v-groove chip.

3. The apparatus of claim 1 wherein said substrate is formed from nickel using a LIGA process.

4. The apparatus of claim 1 wherein said substrate is precision molded plastic.

5. The apparatus of claim 1 further comprising an index-matched material connecting said first collimator to said prism.

6. The apparatus of claim 5 wherein said index-matched material comprises an index-matched adhesive.

7. The apparatus of claim 1 wherein said prism is molded in place on said substrate from index-matched material.

8. The apparatus of claim 1 wherein both of said first collimator and said second collimator are received in said groove.

9. The apparatus of claim 1 wherein said substrate further comprises a second groove, wherein the other of said first collimator and said second collimator are received in said second groove.

10. The apparatus of claim 5 wherein said index-matched material comprises a sol-gel.

11. A method for making a fiber optic U-turn device comprising a first collimator, a first optical fiber, a second collimator, a second optical fiber, a prism, and a substrate comprising at least one groove, comprising the steps of:
    connecting said first collimator to said first optical fiber;
    connecting said second collimator to said second optical fiber;
    placing said first collimator into said groove of said substrate;
    placing said second collimator onto said substrate in a predetermined orientation relative to said first collimator;
    placing said prism onto said substrate in optical alignment with said first and second collimators;
    connecting said first collimator to said prism; and
    connecting said second collimator to said prism.

12. The method of claim 11 wherein the steps of connecting said first collimator to said prism and connecting said second collimator to said prism comprise using an index matched adhesive to bond said first and second collimators to said prism.

13. The method of claim 12 wherein said index matched adhesive comprises a sol-gel.

14. A method for making a fiber optic U-turn device, comprising the steps of:
    optically coupling a first collimator to a first optical fiber;
    optically coupling a second collimator to a second optical fiber;
    placing said first collimator onto a substrate;
    placing said second collimator onto said substrate in a predetermined orientation relative to said first collimator; and
    forming a prism in-situ on said substrate in optical association with said first collimator and said second collimator.

15. The method of claim 14 wherein said step of forming said prism comprises using an index-matched material to mold a prism onto said substrate in a predetermined orientation relative to said first and second collimators such that said first and second collimators become integrally connected to said prism.

16. The method of claim 14 wherein said substrate comprises at least one groove and wherein the step of placing said first collimator onto said substrate comprises placing said first collimator into said groove.

17. A method for making a fiber optic U-turn device, comprising the steps of:

connecting a first collimator to a first optical fiber;

connecting a second collimator to a second optical fiber;

connecting a first length of coreless optical fiber to said first collimator;

connecting a second length of coreless optical fiber to said second collimator; and forming said first and second lengths of coreless optical fiber into a prism.

18. The method of claim 17 further comprising the steps of placing said first and second collimators in side-by-side abutment;

filling the valleys formed by said step of placing with an adhesive having a refractive index matched to the refractive index of said coreless optical fiber.

19. A fiber optic U-turn device, comprising:

a first collimator;

a first optical fiber connected to said first collimator;

a second collimator;

a second optical fiber connected to- said second collimator;

a prism connected to a free end of said first collimator and a free end of said second collimator, said prism being formed from at least one section of coreless optical fiber.

20. A method for making a fiber optic U-turn device, comprising the steps of:

connecting a first collimator to a first optical fiber;

connecting a second collimator to a second optical fiber;

connecting a length of coreless optical fiber to said first and said second collimators; and forming said length of coreless optical fiber into a prism.

21. An apparatus comprising:

a prism;

a first optical fiber having a first end, said first end of said first optical fiber coupled to said prism;

a second optical fiber having a first end, said first end of said second optical fiber coupled to said prism; and a substrate adapted to receive said first optical fiber, said second optical fiber and said prism in predetermined optical alignment with each other, said substrate comprising at least a first groove; said first groove receiving at least one of said first optical fiber and said second optical fiber.

22. The apparatus of claim 21, said first groove further receiving the other of said first optical fiber and said second optical fiber.

23. The apparatus of claim 21, said substrate further comprising a second groove, said second groove receiving the other of said first optical fiber and said second optical fiber.

24. The apparatus of claim 21, further comprising a first collimator having a first end and a second end, said first end of said first collimator coupled to said prism and said second end of said first collimator coupled to said first end of said first optical fiber.

25. The apparatus of claim 24, said first groove further receiving said first collimator.

26. The apparatus of claim 24, further comprising a second collimator having a first end and a second end, said first end of said second collimator coupled to said prism and said second end of said second collimator coupled to said first end of said second optical fiber;

said first groove further receiving at least one of said first collimator and said second collimator.

27. The apparatus of claim 21 wherein said first optical fiber and said second optical fiber are in side-by-side abutment.

28. The apparatus of claim 21 wherein said substrate is a silicon v-groove chip.

29. The apparatus of claim 21 further comprising an index-matched material coupling at least one of said first and second optical fibers to said prism.

30. The apparatus of claim 29 wherein said index-matched material comprises an index-matched adhesive.

31. The apparatus of claim 21 further comprising:

a focusing lens coupled to said prism; and a section of coreless optical fiber having a first end and a second end, said first end of said section of coreless optical fiber coupled to said focusing lens and second end of said section of coreless optical fiber coupled to said first end of said first optical fiber.

32. The apparatus of claim 31 said first groove further receiving at least one of said focusing lens and said section of coreless fiber.

33. A method for making a fiber optic U-turn device comprising a first optical fiber having a first end, a second optical fiber having a first end, a prism, and a substrate adapted to receive said first optical fiber, said second optical fiber and said prism in predetermined alignment with each other, said substrate comprising at least a first groove, said method comprising the steps of:

placing one of said first optical fiber and said second optical fiber into said first groove;

placing the other of said first optical fiber and said second optical fiber onto said substrate in predetermined alignment with said one of said first optical fiber and said second optical fiber;

positioning said prism onto said substrate in predetermined alignment with said first and second optical fibers;

optically coupling said first optical fiber with said prism; and optically coupling said second optical fiber with said prism.

34. The method of claim 33 further comprising the steps of mechanically coupling said first optical fiber with said prism and mechanically coupling said second optical fiber with said prism.

35. The method of claim 33 further comprising the steps of:

coupling said first optical fiber to a first collimator;

coupling said first collimator to said prism;

coupling said second optical fiber to a second collimator; and coupling said second collimator to said prism.

36. The method of claim 35 wherein said steps of connecting said first collimator to said prism and connecting said second collimator to said prism comprise using an index matched adhesive to bond said first and second collimators to said prism.

37. The method of claim 33 wherein said step of positioning said prism onto said substrate comprises molding from index-matched material said prism in-situ at a predetermined location of said substrate.

38. The method of claim 33 wherein said step of placing the other of said first optical fiber and said second optical fiber onto said substrate comprises placing the other of said first optical fiber and said second optical fiber into said first groove.

39. The method of claim 33 wherein said substrate further comprises a second groove and said step of placing the other of said first optical fiber and said second optical fiber onto said substrate comprises placing the other of said first optical fiber and said second optical fiber into said second groove.

40. A method for making a fiber optic U-turn device comprising a first optical fiber having a first end, a first collimator having a first end an a second end, a second optical fiber having a first end, a second collimator having a first end an a second end, and a substrate comprising at least a first groove said method comprising the steps of:
- preparing a first subassembly by connecting said first end of said first optical fiber to said first end of said first collimator;
- preparing a second subassembly by connecting said first end of said second optical fiber to said first end of said second collimator;
- connecting said second end of said first collimator to a first section of coreless optical fiber;
- connecting said second end of said second collimator to a second section of coreless optical fiber;
- joining said first section of coreless optical fiber to said second section of coreless optical fiber; and
- forming said first and second sections of coreless optical fiber into a prism.

41. The apparatus of claim 40 further comprising the steps of:
- placing one of said first subassembly and said second subassembly into said first channel;
- placing the other of said first subassembly and said second subassembly onto said substrate in predetermined alignment with one of said first subassembly and said second subassembly.

42. The apparatus of claim 40 further comprising the steps of:
- placing said first and second collimators in side-by-side abutment; and
- filling the valleys thus formed with an adhesive having a refractive index matched to the refractive index of said first and second collimators.

* * * * *

UNITED STATES PATENT AND TRADEMARK OFFICE
CERTIFICATE OF CORRECTION

PATENT NO. : 6,775,436 B1
DATED : August 10, 2004
INVENTOR(S) : Schroll et al.

It is certified that error appears in the above-identified patent and that said Letters Patent is hereby corrected as shown below:

Column 2,
Line 25, delete "When" and insert -- Where --

Column 3,
Line 17, delete "10" and insert -- 110 --
Line 51, delete "112"

Column 5,
Line 25, delete "FIGS. 6 and also" and insert -- FIGS. 6 and 7 also --

Column 7,
Line 22, delete "to-" and insert -- to --

Signed and Sealed this

Fourteenth Day of December, 2004

JON W. DUDAS
*Director of the United States Patent and Trademark Office*